United States Patent Office 2,874,117
Patented Feb. 17, 1959

2,874,117

REMOVAL OF CATIONS BY ION-EXCHANGE RESINS CONTAINING SULFINIC ACID GROUPS

Jesse C. H. Hwa, Levittown, Pa., assignor to Rohm & Haas Company, Philadelphia, Pa., a corporation of Delaware No Drawing. Application September 19, 1955
Serial No. 535,283

8 Claims. (Cl. 210—32)

This invention relates to the preparation of cation-exchange resins which are insoluble in aqueous solutions of acids, bases and salts and which contain sulfinic acid or metal sulfinate groups as their functional, cation-adsorbing groups.

The products of this invention are particularly useful for water-softening because they adsorb the hardness imparting ions—chiefly calcium and magnesium ions—very efficiently and yet can be regenerated readily and economically.

The sulfinic acid resins are made by reacting sulfur dioxide, in the presence of a Friedel-Crafts catalyst, with a cross-linked, insoluble and infusible copolymer of a monovinyl hydrocarbon and a compound which is copolymerizable with said monovinyl hydrocarbon and which contains at least two non-conjugated vinylidene groups of the formula, $CH_2=C<$.

While styrene is the preferred monovinyl hydrocarbon because of its availability and low cost, others such as vinyltoluene, vinylnaphthalene, vinylanthracene and ethylstyrene can be employed in forming the insoluble copolymer. Divinylbenzene is the copolymerizable, polyvinylidene cross-linking agent of first choice; but other cross-linkers such as divinylnaphthalene, divinylethylbenzenes, divinylxylenes and ethylene glycol dimethacrylate are likewise operable.

The insoluble copolymers can be prepared by a variety of well-known methods. Thus, the mixtures of copolymerizable monomers can be subjected to polymerization en masse, or they can be emulsified or otherwise suspended in a liquid medium and then polymerized. Emulsion-polymerization and suspension-polymerization, in which the mixtures of monomers are first suspended in a non-solvent, such as water or brine solution, and are then heated, agitated and copolymerized, are much preferred because these methods yield hard copolymers in the form of small spheroids, globules, or "beads"; and the size of such particles can be regulated and controlled.

The copolymerization of the vinyl compounds is accelerated by means of well-known free-radical catalysts. These catalysts are typified by acetyl peroxide, lauroyl peroxide, stearoyl peroxide, tert-butyl hydroperoxide, benzoyl peroxide, tert-butyl perbenzoate, di-tert-butyl diperphthalate, di-tert-butyl peroxide, barium peroxide, sodium peroxide, hydrogen peroxide and the so-called "per" salts such as the water-soluble perborates, persulfates and perchlorates. The catalysts are employed in suitable amounts ranging from 0.1% to about 2% based on the weight of the monomeric material to be polymerized.

It is recommended that the monovinyl hydrocarbon constitute from 70% to 99.9%, on a molar basis, of the copolymerizable mixtures of monovinyl hydrocarbon and polyvinylidene, cross-linking agent.

Copolymers of mixtures of cross-linking agents and two or more of the monovinyl hydrocarbons are included among the compositions which are reacted with sulfur dioxide by the process of this invention.

For reaction with the sulfur dioxide, the particles of resin are suspended in an organic liquid—preferably one which is inert toward sulfur dioxide. Halogenated, aliphatic hydrocarbons are a class of liquids which can be used satisfactorily. These are typified by ethylene dichloride, carbon tetrachloride, perchloroethylene, ethylidene chloride, ethyl bromide, and the like. The particles of the resinous copolymers swell in these liquids; but they do not dissolve. In the swollen condition, the particles of the copolymers react very readily with the sulfur dioxide.

The reaction is catalyzed by Friedel-Crafts catalysts which are a well-recognized class of compounds. Aluminum chloride is the preferred catalyst because of its effectiveness and availability; but others, such as the chlorides and bromides of titanium, tin and zinc, can be used. While as little as 1% catalyst based on the weight of the cross-linked copolymer can be used, it is much preferred to employ from about 0.3 mole to about 1.5 moles of catalyst per mole of copolymerized compounds in the copolymer.

In the preferred process, the mixture of the resin particles, organic liquid and catalyst is agitated at a temperature from about 0° C. to about 40° C. while gaseous sulfur dioxide is bubbled into the mixture. This can be done quite satisfactorily at ambient temperature and atmospheric pressure. Alternatively, the reaction mixture can be heated and the reaction carried out under super-atmospheric pressure. Although it is not required, a trace of mineral acid—preferably hydrochloric acid—can be used to initiate the reaction.

The reaction which takes place is illustrated by the following, wherein the formula

represents one unit of styrene in a cross-linked copolymer:

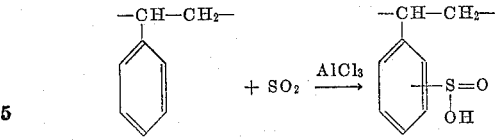

It should be noted that sulfinic acid groups can also become attached to the aromatic nuclei of the copolymerized cross-linking agent when the latter is a polyvinyl, aromatic hydrocarbon, such as di- or tri-vinylbenzene. The course of the reaction can be followed by an analysis for sulfur or by determining the cation-adsorbing capacity. The rate of reaction naturally depends upon the temperature and pressure; but, as an example, a resin of good capacity is ordinarily obtained when the reaction is carried out at about 25° C. and at atmospheric pressure for about 16 hours.

When the reaction has progressed to a satisfactory end-point, the reaction mixture is treated with water in order to destroy the catalyst; and the resin is removed by filtration or other appropriate means. The organic liquid is separated from the water and is recoverable by distillation. Any of the organic liquid which is imbibed by the resin is readily removed by steam distillation.

As prepared, the resins are in the acid form. They exchange their hydrogen ions most readily for metallic ions and are thereby converted to the salt form. These resins have a strong affinity for ions of polyvalent metals and, accordingly, are particularly adapted for use in water-conditioning. They are not as strongly acidic as those which contain sulfonic acid groups, and because of this characteristic they have the advantage over the latter of being more easily and efficiently regenerated by treatment with a dilute mineral acid, such as hydrochloric acid or sulfuric acid. This would be helpful in water-conditioning where it is desired to remove cations such as calcium and magnesium by exchanging them for the hydrogen ions held by the resins as part of a demineralization process.

The following examples, in which all parts are by weight, serve to further illustrate the preparation of the resins of this invention:

*Example 1*

A. Into a reactor equipped with thermometer, agitator and reflux condenser was charged 4000 parts of water and 300 parts of a 1.5% aqueous solution of magnesium silicate. Agitation was begun and a solution containing 920 parts of styrene, 80 parts of a commercial grade of divinylbenzene (containing approximately 50% divinylbenzene and 50% ethylstyrene), and 10 parts of benzoyl peroxide was added to the contents of the reactor. The stirred mixture was heated to 90° C. and was held there for 1.5 hours after which it was heated at refluxing temperature for an additional 1.5 hours. The reaction mixture, after being cooled to room temperature, was filtered and the beads of resins were washed with water, air-dried and finally dried in an oven at 125° C. for two hours.

This procedure can be used in the preparation of copolymers of other monovinyl hydrocarbons and other polyvinyl cross-linkers.

B. Into a reactor equipped with thermometer, agitator and gas-delivery tube was charged 156 parts of the resin particles prepared as described in part A above and 1000 parts of ethylene dichloride. The mixture was stirred for 15 minutes during which time the particles of resin swelled appreciably. To the stirred mixture was then added 240 parts of anhydrous aluminum chloride. The reaction mixture was cooled to 5° C. and 14 parts of hydrogen chloride gas was bubbled into it over a period of 20 minutes. Then 142 parts of sulfur dioxide was bubbled into it over a period of 1.5 hours during which time the temperature was maintained within the range of 5° to 20° C. No more sulfur dioxide was added but the mixture was stirred at 5° to 20° C. for an additional hour and was then stirred at room temperature overnight.

The beads of resin were separated by filtration and were washed with ethylene dichloride. The beads of resin, still swollen, were then added to 1500 parts of ice-water, filtered off and thoroughly washed with water. The particles were freed of imbibed ethylene dichloride by steam distillation. The product contained 12.3% sulfur and was in the acid form. That is, the resin contained sulfinic acid groups, $-SO_2H$. It was stirred in 1280 parts of a 7% aqueous solution of sodium hydroxide for eight hours and was thus converted to the sodium salt form. It has a cation-exchange capacity of 4.23 milliequivalents (meq.) per gram dry. The resin, after exhaustion with river water, was rapidly and completely regenerated with two equivalent amounts of 2% sulfuric acid.

*Example 2*

Other sulfinic acid resins were prepared by the procedure of Example 1 above. Thus, for example, a cross-linked copolymer was made by the process described in part A from a mixture containing 83% styrene and 17% divinylbenzene of commercial grade (containing approximately 50% divinylbenzene and 50% ethylstyrene). The procedure of part B was followed; and 156 parts of the resin was dispersed in 800 parts of ethylene dichloride and was reacted with 78.5 parts of sulfur dioxide in the presence of 240 parts of anhydrous aluminum chloride. The product had a capacity for exchanging cations equal to 3.93 meq./g. dry.

I claim:

1. The method of removing cations from a liquid which comprises treating it with a cation-exchange resin comprising an insoluble cross-linked copolymer of a mixture containing (a) 70% to 99.9%, on a molar basis, of a monovinyl aromatic hydrocarbon and (b) 0.1% to 30%, on a molar basis, of a compound which is copolymerizable with said monovinyl aromatic hydrocarbon and which contains at least two vinylidene groups of the formula, $CH_2=C<$, to the aromatic nuclei of which copolymer are attached sulfinic acid groups, $$-SO_2H$$

2. The method of removing cations from a liquid which comprises treating it with a cation-exchange resin comprising an insoluble, cross-linked copolymer of a mixture of (a) 70% to 99.9%, on a molar basis, of styrene and (b) 0.1% to 30%, on a molar basis, of divinylbenzene, to the aromatic nuclei of which copolymer are attached sulfinic acid groups, $-SO_2H$.

3. The method of claim 1 in which calcium is the cation which is removed from the liquid being treated.

4. The method of claim 1 in which magnesium is the cation which is removed from the liquid being treated.

5. The method of claim 2 in which calcium is the cation which is removed from the liquid being treated.

6. The method of claim 2 in which magnesium is the cation which is removed from the liquid being treated.

7. The method of claim 1 followed by the step in which the resin is regenerated with sulfuric acid preparatory to further removal of cations from a liquid.

8. The method of claim 2 followed by the step in which the resin is regenerated with sulfuric acid preparatory to further removal of cations from a liquid.

References Cited in the file of this patent

UNITED STATES PATENTS 2,500,149    Boyer  ---------------- Mar. 14, 1950
2,735,841    Allen et al.  ------------ Feb. 21, 1956